United States Patent
Cui et al.

(10) Patent No.: US 9,998,979 B2
(45) Date of Patent: Jun. 12, 2018

(54) UTILIZING EXPLICIT CONGESTION NOTIFICATION FOR NETWORK SELECTION

(71) Applicant: AT&T Intellectual Property I, L.P., Atlanta, GA (US)

(72) Inventors: Zhi Cui, Sugar Hill, GA (US); Farooq Bari, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

(21) Appl. No.: 15/478,577

(22) Filed: Apr. 4, 2017

(65) Prior Publication Data

US 2017/0208534 A1    Jul. 20, 2017

Related U.S. Application Data

(63) Continuation of application No. 14/055,308, filed on Oct. 16, 2013, now Pat. No. 9,648,560.

(51) Int. Cl.

| H04W 4/00 | (2018.01) |
|---|---|
| H04W 48/06 | (2009.01) |
| H04W 48/20 | (2009.01) |
| H04W 28/02 | (2009.01) |
| H04L 29/06 | (2006.01) |

(Continued)

(52) U.S. Cl.
CPC .............. *H04W 48/06* (2013.01); *H04L 69/22* (2013.01); *H04W 24/10* (2013.01); *H04W 28/0284* (2013.01); *H04W 48/20* (2013.01); *H04W 84/12* (2013.01)

(58) Field of Classification Search
CPC .................................................. H04W 48/06
USPC ......................................................... 370/254
See application file for complete search history.

(56) References Cited

U.S. PATENT DOCUMENTS

| 6,226,265 B1 * | 5/2001 | Nakamichi ......... H04L 12/5602 370/235 |
|---|---|---|
| 6,741,555 B1 | 5/2004 | Li et al. |
| 7,145,888 B2 | 12/2006 | Dale et al. |

(Continued)

FOREIGN PATENT DOCUMENTS

| CN | 101112056 A | 1/2008 |
|---|---|---|
| CN | 101107822 B | 11/2010 |
| KR | 865722 B1 | 10/2008 |

OTHER PUBLICATIONS

Kuhlewind, et al., "Design and evaluation of schemes for more accurate ECN feedback," Workshop on Telecommunications: From Research to Standards, 2012, pp. 6937, 6941. Retrieved on Aug. 15, 2013, 5 pages.

(Continued)

*Primary Examiner* — Samina Choudhry
(74) *Attorney, Agent, or Firm* — Amin, Turocy & Watson, LLP

(57) ABSTRACT

Explicit congestion notification (ECN) bits that have traditionally been utilized in end to end congestion mitigation can be redefined to identify and compare congested and uncongested wireless accesses. Accordingly, mobile devices or other user equipment can leverage ECN data in order to make intelligent network selection, e.g., selecting a network with no congestion over one in a congested state. Accordingly, an application executing at the mobile device can send or receive data via the selected network that is selected based on ECN data.

20 Claims, 10 Drawing Sheets

(51) Int. Cl.
*H04W 24/10* (2009.01)
*H04W 84/12* (2009.01)

(56) References Cited

U.S. PATENT DOCUMENTS

| | | |
|---|---|---|
| 7,369,498 B1 | 5/2008 | Ma et al. |
| 7,457,245 B2 | 11/2008 | McAlpine et al. |
| 7,606,188 B2 | 10/2009 | Dale et al. |
| 7,733,770 B2 | 6/2010 | McAlpine et al. |
| 7,760,646 B2 | 7/2010 | Kekki |
| 7,839,777 B2 | 11/2010 | DeCusatis et al. |
| 7,961,605 B2 | 6/2011 | Gusat et al. |
| 8,130,655 B2 | 3/2012 | Foottit et al. |
| 8,335,161 B2 | 12/2012 | Foottit et al. |
| 8,411,561 B2 | 4/2013 | Schliwa-Bertling et al. |
| 9,060,296 B1 | 6/2015 | Bertz |
| 9,215,180 B1 | 12/2015 | Bertz |
| 9,445,334 B2 * | 9/2016 | Tinnakornsrisuphap H04W 36/22 |
| 2003/0139197 A1 | 7/2003 | Kostic et al. |
| 2007/0081462 A1 | 4/2007 | Gefflaut et al. |
| 2008/0304413 A1 * | 12/2008 | Briscoe ............... H04L 69/16 370/235 |
| 2009/0285099 A1 | 11/2009 | Kahn et al. |
| 2010/0142539 A1 * | 6/2010 | Gooch ............... H04L 47/10 370/400 |
| 2010/0238805 A1 | 9/2010 | Ludwig et al. |
| 2014/0162675 A1 | 6/2014 | Rost et al. |
| 2014/0213276 A1 * | 7/2014 | Breitbach ......... H04W 28/0268 455/452.2 |

OTHER PUBLICATIONS

Li et al., "Distributed ECN-Based Congestion Control," Communications, 2009. ICC '09. IEEE International Conference, 2009, pp. 1,6. Retrieved on Aug. 15, 2013, 6 pages.

Xia, et al., "One More Bit is Enough," Networking, IEEE/ACM Transactions on Networking, vol. 16, No. 6, Dec. 2008, pp. 1281,1294. Retrieved on Aug. 15, 2013, 14 pages.

Qazi, et al., "Congestion Control using Efficient Explicit Feedback," INFOCOM 2009, IEEE, 2009, pp. 10,18. Retrieved on Aug. 15, 2013, 9 pages.

Wang et al., "An Explicit Congestion Control Protocol Based on Bandwidth Estimation," Global Telecommunications Conference (GLOBECOM 2011), 2011 IEEE, 2011, pp. 1,5. Retrieved on Aug. 15, 2013, 5 pages.

Woldeselassie, et al., "Forecasting Full-Path Network Congestion Using One Bit Signalling," IEEE ICC 2010 proceedings, pp. 1,5. Retrieved on Aug. 15, 2013, 5 pages.

Office Action for U.S. Appl. No. 14/055,308 dated Dec. 31, 2015, 21 pages.

Office Action for U.S. Appl. No. 14/055,308 dated Jun. 22, 2016, 37 pages.

Office Action for U.S. Appl. No. 14/055,308 dated Jun. 30, 2015, 24 pages.

* cited by examiner

UTILIZING EXPLICIT CONGESTION NOTIFICATION FOR NETWORK SELECTION

CROSS-REFERENCE TO RELATED APPLICATIONS

This application is a continuation of, and claims priority to, U.S. patent application Ser. No. 14/055,308 (now U.S. Pat. No. 9,648,560), filed on Oct. 16, 2013, entitled "UTILIZING EXPLICIT CONGESTION NOTIFICATION FOR NETWORK SELECTION." The entirety of the above noted application is incorporated herein by reference.

TECHNICAL FIELD

The present application relates generally to utilizing data carried in explicit congestion notification (ECN) bits of a packet's IP header for determining or selecting among various available wireless access networks to carry network traffic.

BACKGROUND

Various third generation partnership project (3GPP) standards such as universal mobile telecommunications system (UMTS) standards and long term evolution (LTE) standards allow for use of explicit congestion notification (ECN) data that is defined by Internet engineering task force (IETF). This usage of ECN in 3GPP accesses is for rate limiting of data by applications. ECN data is employed on the provider side of many cellular communication networks. For example, some cellular networks utilize ECN data in order to affect transmission connection protocol (TCP)/Internet protocol (IP) data flows between various provider-side devices. Recently, the use of ECN data has been extended to certain user datagram protocol (UDP) services implemented on the provider-side of cellular based networks.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
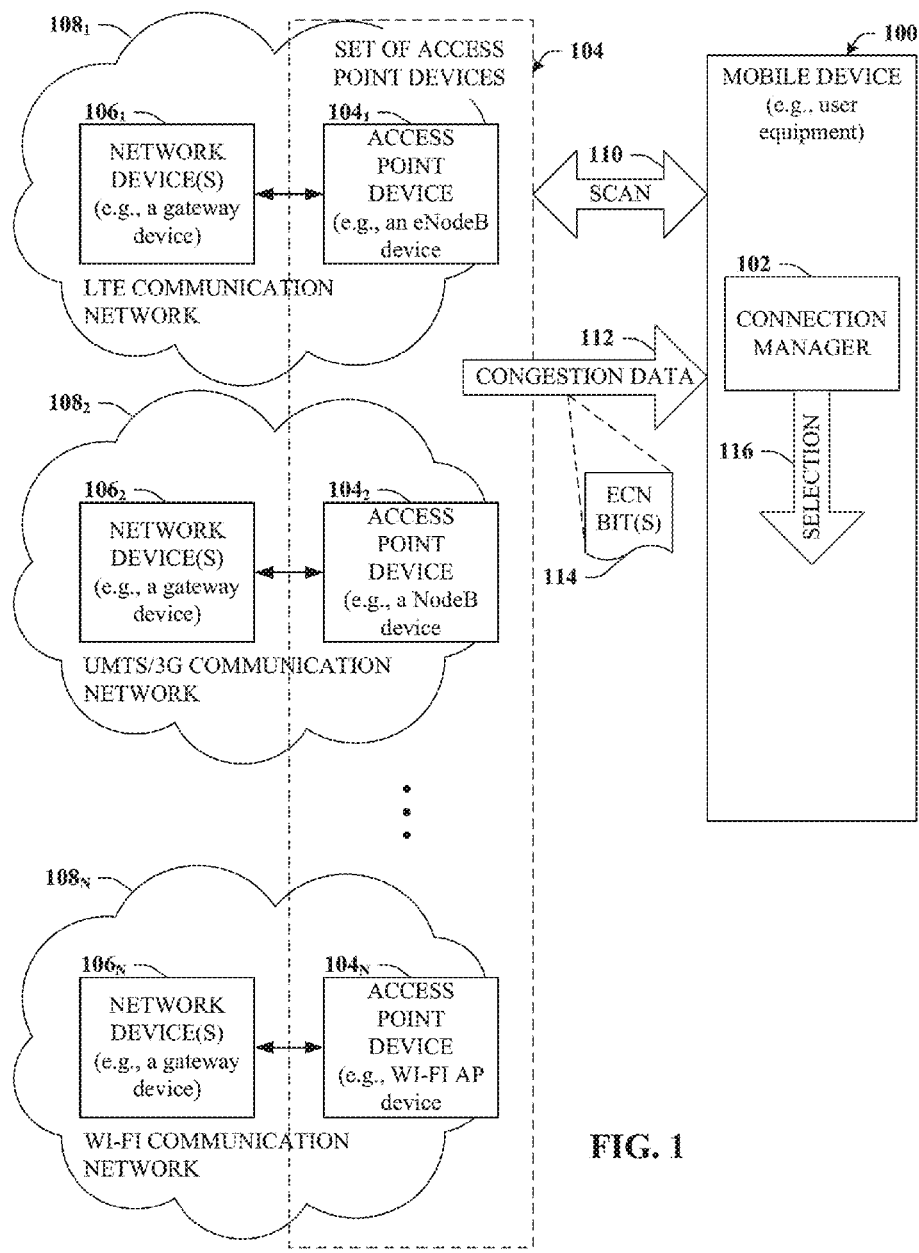
FIG. 1 illustrates a block diagram of an example mobile device that can provide for network selection based on explicit congestion notification (ECN) data in accordance with certain embodiments of this disclosure.

Mobile traffic has been growing at a very fast pace and that growth trend is expect to continue. To meet the mobile traffic growth as well as to improve end user experience, mobile service providers are actively seeking mechanisms to improve system capacity and end user experience in a manner that can leverage all available radio technologies, including, for example, cellular networks (e.g., universal mobile telecommunications system (UMTS), long term evolution (LTE), etc.), and non-cellular networks such as wireless fidelity (Wi-Fi) or any wireless local area network protocol such as IEEE 802.11, or others.

Current communication network frameworks typically designate network selection (and/or data traffic to be carried over a given network) based on availability or based on radio frequency (RF) conditions. Thus, one such mechanism to improve conditions can relate to intelligently steering user traffic to a best radio network in terms of less congestion. Such intelligent network selection can take into account real-time radio congestion condition, which can ultimately improve system performance and user experience.

Another trend in the industry indicates the number or proportion of user devices that are smart devices is increasing. Further, as smart devices are becoming more intelligent about and aware of services, mobility state (e.g., moving speed), performance measurements or metrics, battery state, and so forth at the device, it becomes increasing important and therefore is becoming an industry trend for these smart devices to make intelligent selection as to what data applications should steer to which radio access network. Moreover, such can be based on the mentioned intelligence at the device, as well as based on the conditions of radio networks.

However, in order to provide a mechanism that can facilitate intelligent network selection and/or intelligently steering network traffic, certain challenges arise. For example, if a user device is to select one network from among several available networks to use in transmitting (or receiving) application data and to do so based on a congestion state of these available networks, then the user device typically must be able receive information associated with the various congestion states and/or to make a determination about the various congestions states of the available networks.

As noted in the background section, explicit congestion notification (ECN) data exists, and is used by previous systems in order to meet other challenges that exist in the industry. In particular, ECN data has been employed to identify congestion states of networks, but such is typically only used in connection with determinations made at provider-side cellular network devices (e.g., in a core portion of the network). Accordingly, previous implementations do not utilize this ECN data at the user-side (e.g., radio access network (RAN) portion) such as at a mobile device or other user equipment (UE).

The disclosed subject matter relates to extending the use of ECN data to non-cellular communication networks (e.g., Wi-Fi) as well as to devices at the RAN portion of a communication network (e.g., mobile devices). Accordingly, the disclosed subject matter can be implemented with little or no change to existing cellular platforms (e.g., UMTS, LTE, etc.) and can provide many additional features that can be leveraged by applications executing on a smart mobile device, such as the feature of intelligently routing application traffic based on network congestions indicator(s) or other congestion data.

In other words, the disclosed subject matter can provide an enabler or connection manager for smart mobile devices to make intelligent radio network selection across available cellular (e.g., UMTS, LTE, etc.) networks and other available networks (e.g., Wi-Fi, worldwide interoperability for microwave access (WiMAX), etc.). In some embodiments, this intelligent selection can apply to selection of the particular network that will be used to transmit or receive data associated with applications executing on the mobile device and can be based on real time information associated with radio network congestion conditions. The mechanism utilized to determine the radio network congestion conditions can be ECN data that can be employed at the mobile device as a general-purpose, qualitative, access network-agnostic congestion indicator.

Network Selection Based on ECN Data

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, mobile device 100 is depicted. Mobile device 100 can provide for network selection based on explicit congestion notification (ECN) data. Mobile device 100 can represent any suitable user equipment (UE) that can access data or services of a communication network provider, either cellular or non-cellular, and can include a memory to store instructions and, coupled to the memory, a processor that facilitates execution of the instructions to perform operations. Examples of the memory and processor can be found with reference to FIG. 10. It is to be appreciated that the computer 1002 can represent a service device of a communications network or a user equipment device and can be used in connection with implementing one or more of the systems or components shown and described in connection with FIG. 1 and other figures disclosed herein.

In particular, mobile device 100 can include connection manager 102 that can be configured to facilitate, either alone or in conjunction with other components, all or a portion of the operations detailed herein with respect to mobile device 100.

Mobile device 100 can be configured to identify a set of access point devices $104_1$-$104_N$ that facilitate access to network devices $106_1$-$106_N$ of associated communication networks $108_1$-$108_N$. Set of access point devices 104, network devices 106, and communication networks 108 can include substantially any number, N, of individual access point devices $104_1$-$104_N$, individual network devices $106_1$-$106_N$, and individual communication networks, which are hereinafter respectively referred to, either individually or collectively, as access point device(s) 104, network device(s) 106, or communication network(s) 108 with appropriate subscripts generally employed only when instructive or convenient to highlight various distinctions or to better impart the disclosed concepts.

As one example, access point device $104_1$ can be an eNodeB device that provides mobile device 100 access to network device $106_1$ of an LTE communication network $108_1$. As another example, access point device $104_2$ can be a NodeB device that provides mobile device 100 access to network device $106_2$ of a UMTS or 3G communication network $108_2$. As still another example, access point device $104_N$ can be a Wi-Fi access point (AP) device that provides mobile device 100 access to network device $106_N$ of a Wi-Fi communication network $108_N$. In these and other examples, network devices 106 can relate to gateway devices that reside in a core network of the associated communication network 108. Thus, network devices 106 and access point devices 104 can represent the boundary between the core network of associated communication networks 108 and the radio access network (RAN) of associated communication networks 108, the latter of which can include mobile device 100.

In some embodiments, set of access point devices 104 can include all the various access point devices 104 that are in range of or otherwise available to serve mobile device 100, which is further detailed in connection with FIG. 2. Identification of available of access point devices 104 can be accomplished in connection with scan 110. In some embodiments, scan 110 can relate to a network selection scan performed by mobile device 100. In some embodiments, scan 110 can relate to a scan that differs from a network selection scan, such as a scan of networks with which connections currently exist.

Figure 2:
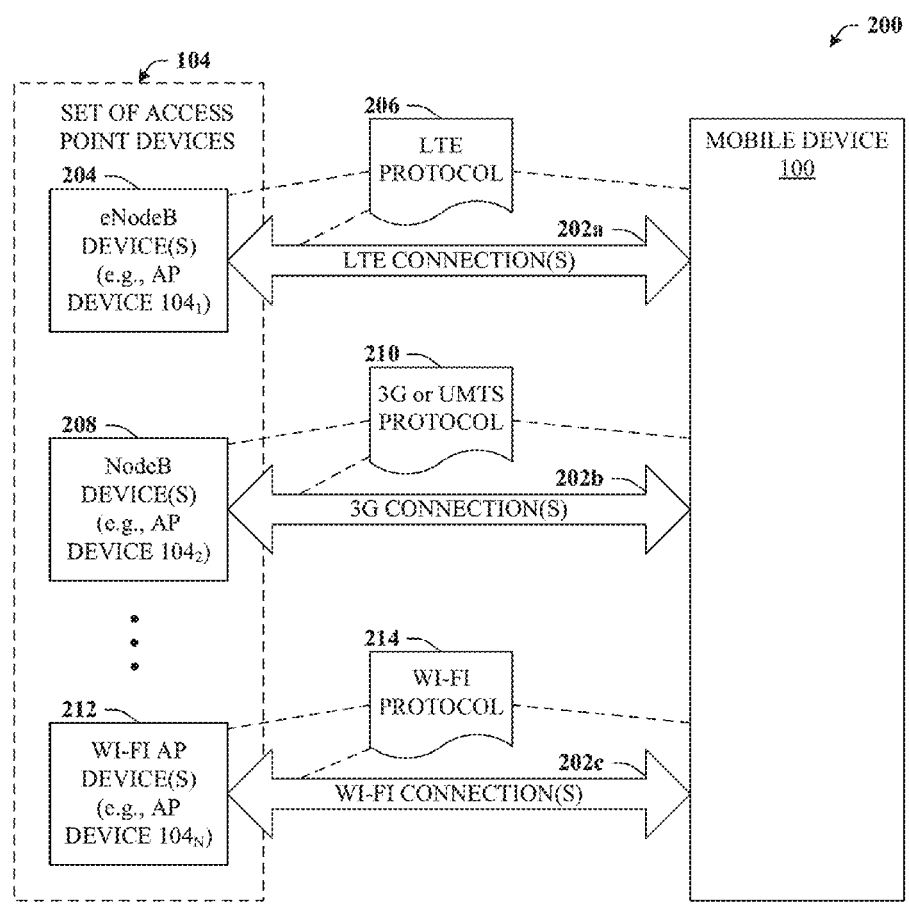
FIG. 2 illustrates a block diagram of an example system that illustrates multiple connections between the mobile device and multiple access points in accordance with certain embodiments of this disclosure.

While still referring to FIG. 1, but turning now as well to FIG. 2, system 200 is depicted. System 200 illustrates multiple connections between the mobile device 100 and multiple access points 104. For example, consider a network selection scan (e.g., scan 110) that is performed at mobile device 100 in which three eNodeB devices 204 are discovered and/or in range. Mobile device 100 might select one or more of those eNodeB devices 204 and establish one or more LTE connections 202a in accordance with an LTE protocol 206. Further suppose the network selection scan indicates two NodeB devices 208 that are in range or otherwise available, at least one of which can be leveraged to establish 3GPP connection 202b that operates according to 3G/UMTS protocol 210. Additionally or alternatively, mobile device can establish Wi-Fi connection 202c according to Wi-Fi protocol 214 with one or more Wi-Fi access point devices 212.

It is understood that other connections 202 can exist in accordance with any suitable protocol. However, this example illustrates that mobile device 100 can have concurrent connections 202 with multiple access point devices 104. As a common example, mobile device 100 can have a connection 202a established with a cellular network (e.g., LTE) and a connection 202c established with a non-cellular network (e.g., Wi-Fi).

Still referring to FIG. 1, because concurrent connections 202 can exist among multiple available networks 108, intelligent selection of a particular network 108 to use when transmitting data can be advantageous. For example, if it is determined that communication networks $108_1$ and $108_2$ associated with access point devices $104_1$ and $104_2$ are congested, but that communication network $108_N$ associated with access point devices $104_N$ is not congested, then such information can be leveraged by mobile device 100 in a manner that can, e.g., increase data throughput and improve the experiences of a user.

Thus, mobile device 100 can be configured to receive from set of access point devices 104 congestion data 112. Congestion data 112 can comprise one or more ECN bits 114. Upon receipt of congestion data 112, mobile device 100 and/or connection manager 102 can make a determination as to the congestion conditions for various networks 108 associated with the set of access point devices 104. Upon making that determination, mobile device (e.g., connection manager 102) can select an access point device 104 from set of access point devices 104 based on congestion data 112, which is illustrated by selection 116. Selection 116 can be leveraged in various ways that can improve services associated with network providers, an example of which can be found in connection with FIG. 3.

Figure 3:
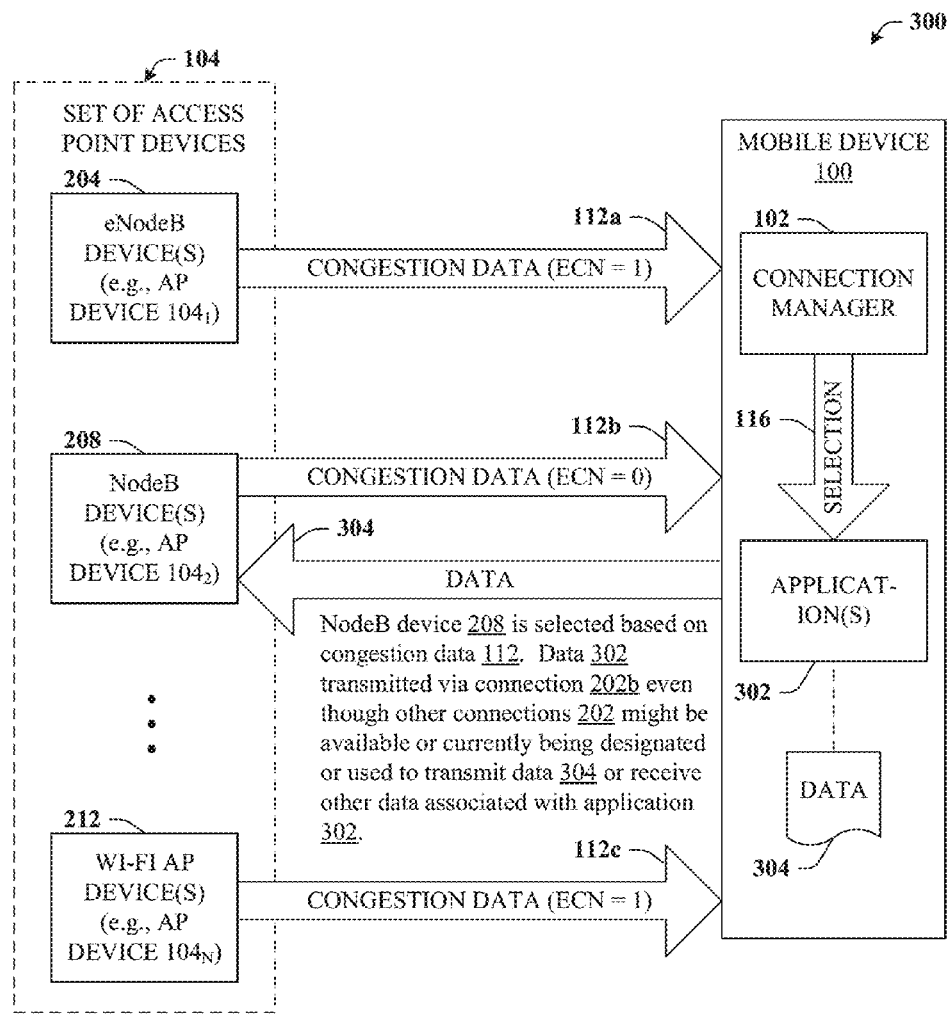
FIG. 3 illustrates a block diagram of an example system illustrating utilization of ECN data to select a network to carry data associated with an application executing on the mobile device in accordance with certain embodiments of this disclosure.

Referring now to FIG. 3, system 300 is provided. System 300 illustrates utilization of ECN data to select a network to carry data associated with an application executing on the mobile device 100. Suppose mobile device 100 receives congestion data 112 from three different access point devices 104, an eNodeB device 204, nodeB device 208, and Wi-Fi AP device 212. Further suppose that congestion data 112a (associated with an LTE network 108) and congestion data 112b (associated with a 3G/UMTS network 108) includes ECN bits 114 that indicates these two networks 108 are in a state of congestion. Also, congestion data 112c (associated with a Wi-Fi network 108) include respective ECN bits 114 that indicate this network 108 is not in a congestion state.

Now, consider the case in which mobile device 100 is executing application 302 for which there is data 304 identified to be transmitted from mobile device 100. For example, suppose application 302 relates to a cloud storage based data back-up service and data 304 relates to the data that are to be backed-up (e.g., transmitted to an Internet server).

Conventional systems might approach this situation based on availability such as transmit the data via an eNodeB device or via a Wi-Fi AP device simply because the associated networks are available. For example, conventional systems might be configured based upon default settings or the like to always route certain traffic (e.g., voice calls) to the LTE network when such is available or to always route traffic (e.g., data uploads/downloads) to the Wi-Fi network when such is available.

In contrast, the disclosed subject matter can leverage congestion data 112 to accomplish a more efficient result. For instance, in this case, since the LTE network(s) 108 and Wi-Fi network(s) 108 are determined to be in a state of congestion, data 304 can be transmitted via UMTS network 108 (e.g., via nodeB device 208). Such can occur even if default settings or network selection algorithms might otherwise have selected a different network 108 to propagate data 304, or even if another network 108 was previously being used in connection with application 302.

While the above example specifically describes data 304 in the context of uplink data (e.g., data transmitted from mobile device 100), it is understood that similar features can be achieved in connection with downlink data (e.g., data received by mobile device 100). It is further understood that multiple different applications 302 can be configured to behave differently.

For example, consider an alternative scenario in which congestion data 112 indicates LTE network 108 (accessed via eNodeB 204) is congested, but a Wi-Fi network 108 (accessed via Wi-Fi AP device 212) and a UMTS network 108 (accessed by nodeB device 208) are not congested. Further suppose that a first application 302 (e.g., an application associated with a content streaming service) is requesting streaming video, and a second application 302 (e.g., an application associated with cloud-based data back-up) is requesting a data back-up operation. In that case, both the requests (e.g., uplink data) and traffic resulting from the requests (e.g., downlink data) from various application 302 can be distributed among those networks that are not congested, in this case divided between the available and non-congested Wi-Fi network 108 and the UMTS network 108.

As another alternative scenario, consider the case in which data 112 indicates Wi-Fi network 108 is congested, but UMTS network 108 and LTE network 108 are not congested. Application 302 relates to a content streaming application that is requesting a streaming video. Although only Wi-Fi network 108 might be downgraded in terms of selection 116, LTE network 108 might be selected over UMTS network 108 since the former can provide a better streaming video experience. Thus, selection 116 can be based on congestion data 112 as well as based other data, including existing network selection defaults or algorithms. For instance, in the above scenario, Wi-Fi might be the default when available or when in connection with streaming video. However, even though Wi-Fi is available, the fact that the Wi-Fi network was determined to be congested operated to remove (or lower the priority of) that network from the networks available for selection.

The techniques detailed herein can provide a real time or near real time indicator of network congestion state to the mobile device 100. Hence, mobile device 100 can be configured to rapidly respond to updates associated with ECN bits 114 or other congestion data 112. For example, in some embodiments, updated congestion data (e.g., a most recent embodiment of congestion data 112) can be received from the set of access points 104. In response, another access point device 104 (e.g., different from a previous access point device 104) can be selected based on the updated congestion data. Thereafter, data 304 or other downlink data can be propagated via the other access point device Updating ECN Data As already detailed, many cellular standards or protocols leverage ECN data at devices included in the core network. However, non-cellular networks (e.g., Wi-Fi) typically do not have the capability of providing ECN bit marking based on Wi-Fi network condition. Therefore, in addition to leveraging ECN data at a mobile device, ECN data can also be extended to Wi-Fi or other non-cellular networks, an example of which is provided in connection with FIG. 4

Figure 4:
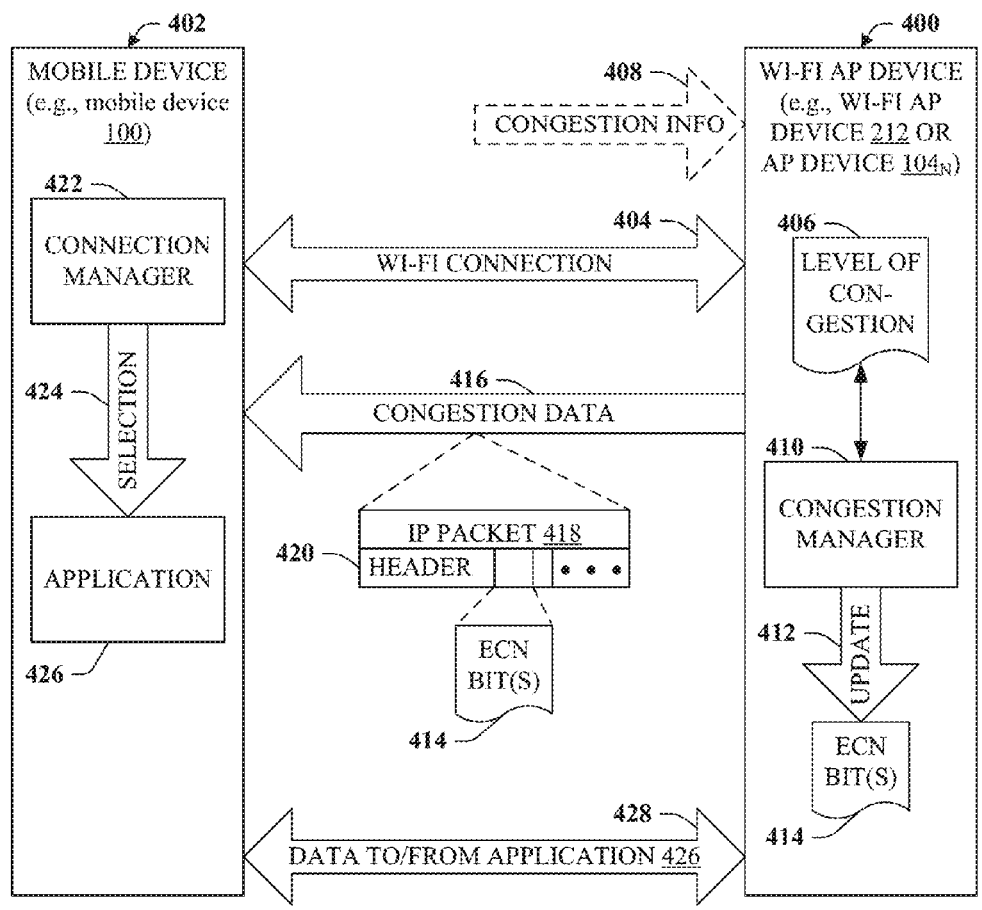
FIG. 4 illustrates a block diagram of an example Wi-Fi access point device that can provide for tagging or updating ECN data in response to a network congestion determination in accordance with certain embodiments of this disclosure.

With reference now to FIG. 4, Wi-Fi AP device 400 is depicted. Wi-Fi AP device 400 provides for tagging or updating ECN data in response to a network congestion determination. Wi-Fi AP device 400 can be configured to establish a network connection with mobile device 402, such as Wi-Fi connection 404 that can be based on a Wi-Fi protocol. Mobile device 402 can be substantially similar to mobile device 100 detailed in connection with FIGS. 1-3.

Wi-Fi AP device 400 can be configured to determine a level of congestion 406 for network devices (not shown) of a communication network (e.g., a Wi-Fi network) associated with Wi-Fi AP device 400. Determination of level of congestion 406 can be accomplished by congestion manager 410 and can, optionally, be based on congestion info 408 that can be received from the Wi-Fi network or another suitable source. For example, congestion info 408 can be received from devices included in a core network of the Wi-Fi network, or Wi-Fi AP.

Wi-Fi AP device 400 can be configured to update 412 certain ECN data. For example, an ECN bit(s) 414 can be updated based on level of congestion 406. As one example, an ECN bit 414 can be set to "0" to indicate a state of no congestion, or set to "1" to indicate a state of congestion. Alternatively, many ECN bits 414 might be employed to provide additional granularity in connection with level of congestion 406 (e.g., a scale from 1-10, etc.).

Wi-Fi AP device 400 can be configured to transmit congestion data 416 to mobile device 402. Congestion data 416 can include ECN bits 414. For example, in some embodiments congestion data 416 can include or be included in an Internet protocol (IP) packet 418. In some embodiments, congestion data 416 such as ECN bits 414 can be included in a header portion 420 of IP packet 418.

In addition to Wi-Fi connection 404, mobile device 402 can also have other connections (not shown) to other access point devices (not shown), from which similar congestion data (e.g., similar to congestion data 416) can be received. All such data, including congestion data 416 can be examined by connection manager 422, which can be substantially similar to connection manager 102 of FIG. 1 and can make a selection 424 as to which network, and by proxy, which associated access point device (e.g., Wi-Fi AP device 400) should be used in connection with application(s) 426 that execute on mobile device 402 and that leverage communication networks to send or receive data 428.

For example, if congestion data 416 indicates that a Wi-Fi network associated with Wi-Fi AP device 400 is not congested, then connection manager 422 might provide selection 424 that indicates Wi-Fi AP device 400 should be selected in connection with data 428. Accordingly, in some embodiments, data 428 can be received at Wi-Fi AP device 400 in response to a network selection 424 procedure performed at mobile device 402. In some embodiments, data 428 can be transmitted from Wi-Fi AP device 400 to mobile device 402 in response to a network selection 424 procedure performed at mobile device 402.

Methods for Network Selection Based on ECN Data

Figure 5:
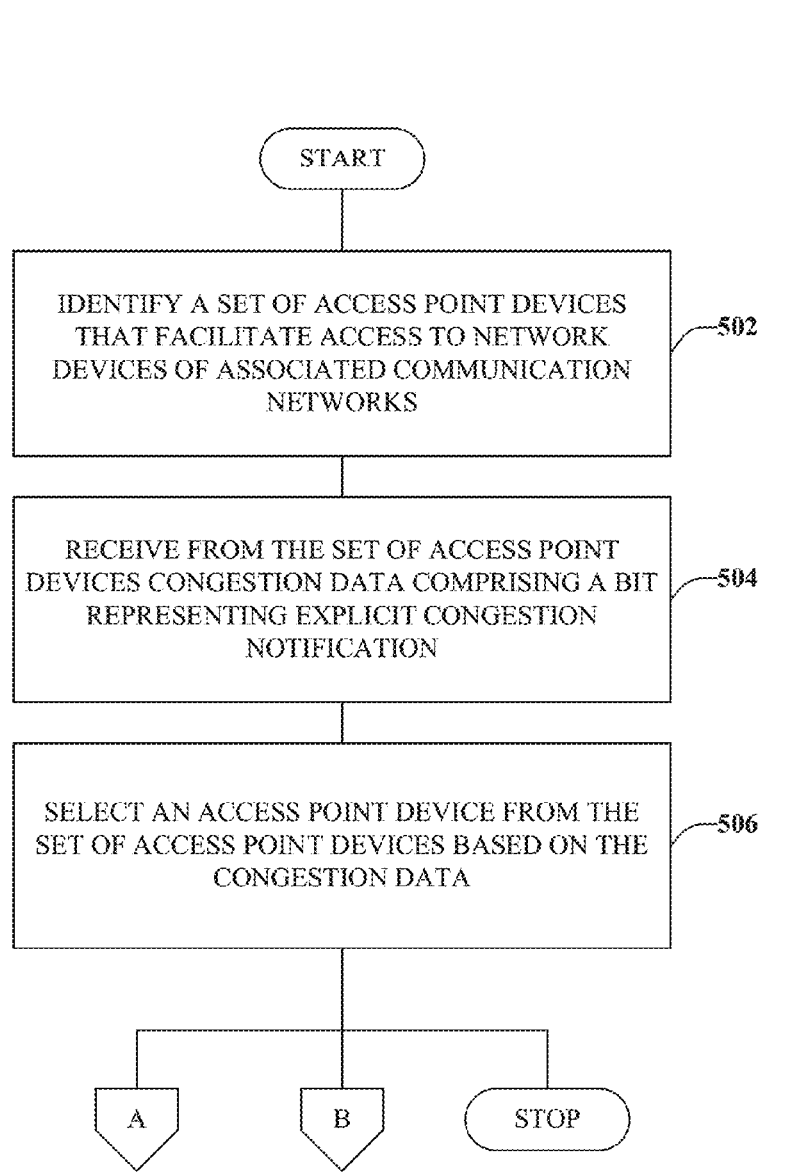
FIG. 5 illustrates an example methodology that can provide for selecting a network for data traffic based on ECN data in accordance with certain embodiments of this disclosure.
Figure 6:
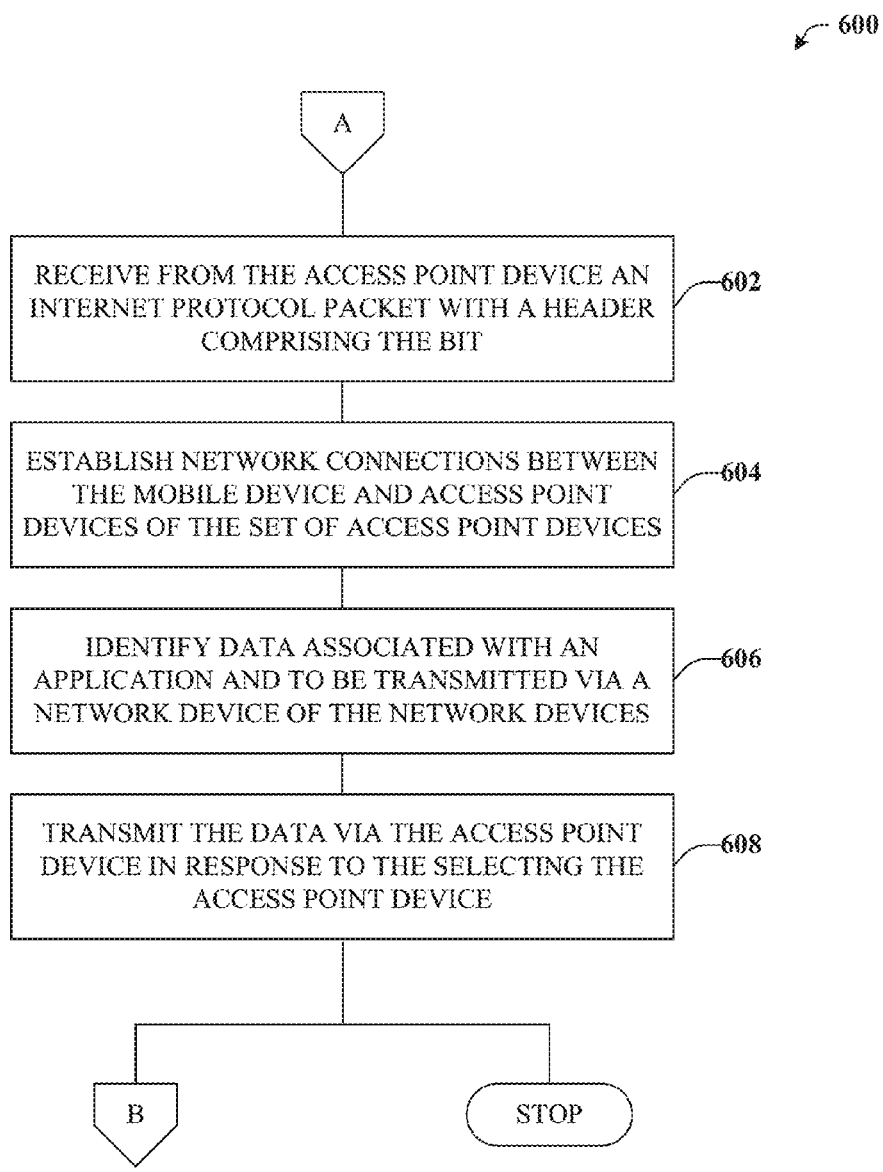
FIG. 6 illustrates an example methodology that can provide for additional features or aspects in connection with selecting a network for data traffic based on ECN data in accordance with certain embodiments of this disclosure.
Figure 7:
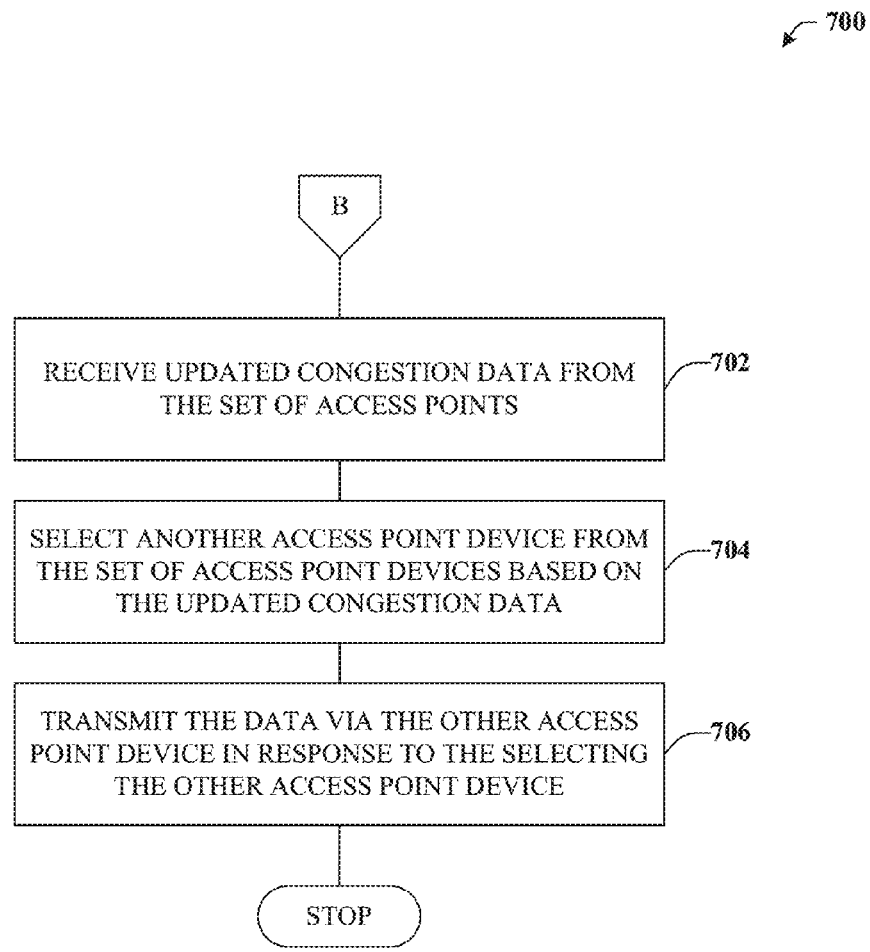
FIG. 7 illustrates an example methodology that can provide for real time or near real time updates to congestion data in accordance with certain embodiments of this disclosure.

FIGS. 5-7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 5, exemplary method 500 is depicted. Method 500 can provide for selecting a network for data traffic based on ECN data. For example, at reference numeral 502, a set of access point devices can be identified. The set of access point devices can facilitate access to network devices (e.g., gateway devices in a core portion of an associated network) of associated communication networks. In some embodiments, the set of access point devices can be access point devices that are in range and/or available to serve a mobile device or other user equipment. In some embodiments, the set of access point devices can be access point devices with which the mobile device or other user equipment has established a connection.

At reference numeral 504, congestion data can be received from all or a portion of the set of access point devices. The congestion data can comprise one or more bits representing explicit congestion notification (ECN).

At reference numeral 506, an access point device from the set of access point devices can be selected. Selection of the access point device can be based on the congestion data. For example, if congestion data (including an ECN bit) is received from three different access point devices, two of which indicate a congestion state and one of which indicates no congestion, then the access point device that indicates no congestion can be selected. In some embodiments, the congestion data can provide a more granular level of congestion than a binary response, and in such embodiments, selection can be based on, e.g., congestion data that indicates a least or lesser amount of congestion.

Turning now to FIG. 6, exemplary method 600 is illustrated. Method 600 can provide for additional features or aspects in connection with selecting a network for data traffic based on ECN data. For example, method 600 can initially proceed to reference numeral 602. At reference numeral 602, an Internet protocol (IP) packet with a header can be received. The IP packet can be received in connection with the receiving congestion data detailed with respect to reference numeral 504 of FIG. 5.

At reference numeral 604, network connections can be established between the mobile device and various access point devices of the set of access point devices. In some embodiments, these connections can be established prior to the identifying the set of access points detailed in connection with reference numeral 502 of FIG. 5.

At reference numeral 606, data associated with an application can be identified. The data can be that which is identified to be transmitted via a network device of the network devices. In other words, data that is slated for uplink transmission to a network. Additionally or alternatively, data slated for downlink receipt from a network can also be identified.

At reference numeral 608, the data can be transmitted via the access point device in response to the selecting the access point device. Put another way, upon selection of a particular access point device, data (either that which is to be transmitted or received) can be propagated by way of the selected access point device. Accordingly, such data can traverse a given network that is more likely to be uncongested or less congested.

Referring now to FIG. 7, exemplary method 700 is illustrated. Method 700 can provide for real time or near real time updates to congestion data. Method 700 can initially proceed to reference numeral 702. At reference numeral 702, updated congestion data can be received from all or a portion of the set of access points. For example, a network for which congestion data previously indicated no congestion might now be in a congested state so that the more recent congestion data associated with that network can indicate such.

At reference numeral 704, another access point device (e.g., different from the access point device selected at reference numeral 506 of FIG. 5) can be selected based on the updated congestion data. At reference numeral 706, the data (transmitted via the access point device at reference numeral 608 of FIG. 6) can be transmitted via the other access point device.

Example Operating Environments

Figure 8:
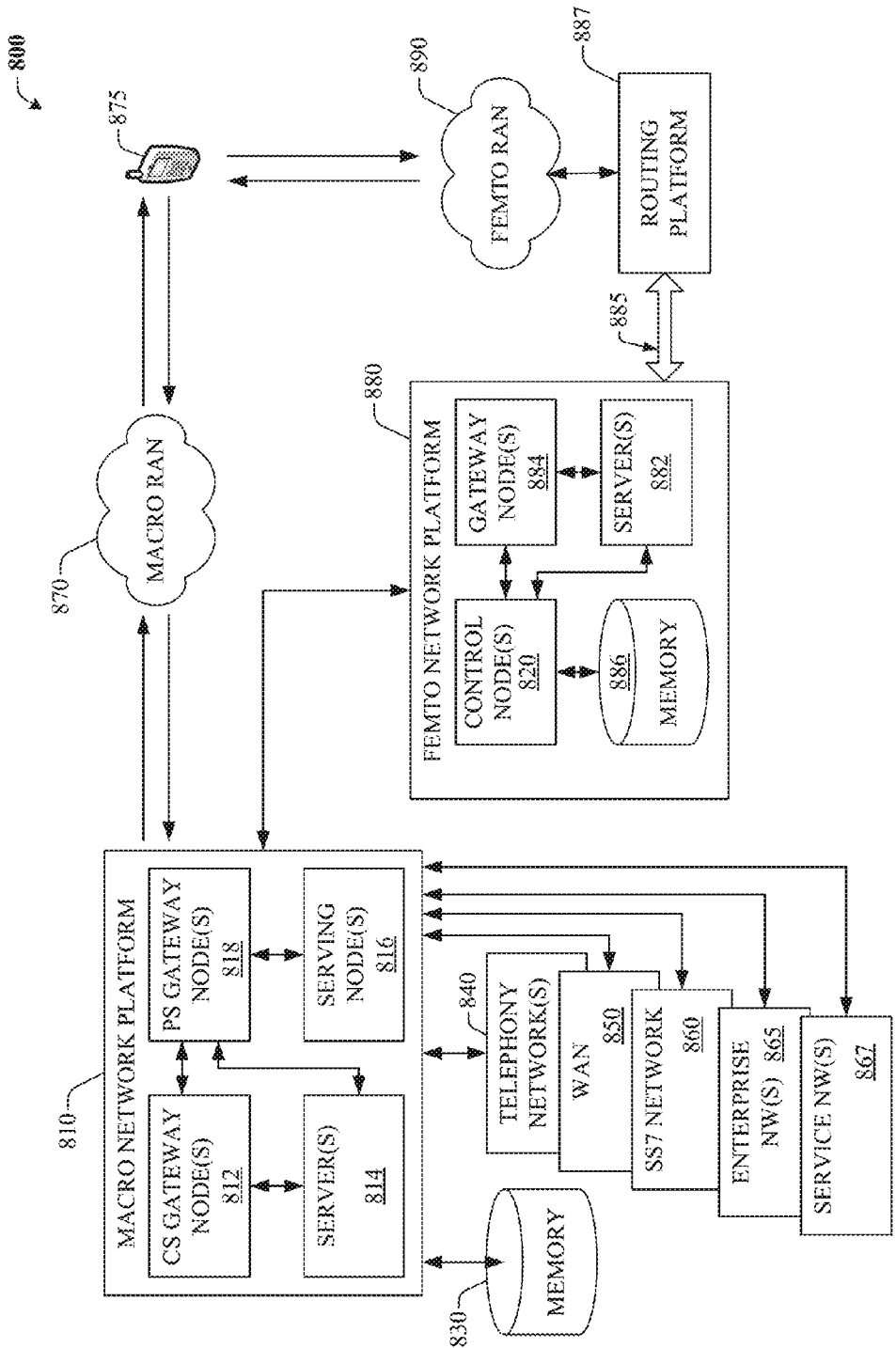
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 includes two wireless network platforms: (i) A macro network platform 810 that serves, or facilitates communication) with user equipment 875 via a macro radio access network (RAN) 870. It should be appreciated that in cellular wireless technologies (e.g., 4G, 3GPP UMTS, HSPA, 3GPP LTE, 3GPP UMB), macro network platform 810 is embodied in a Core Network. (ii) A femto network platform 880, which can provide communication with UE 875 through a femto RAN 890, linked to the femto network platform 880 through a routing platform 82 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 810 includes CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can include traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also includes serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can include one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can include business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also include substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can include one or more processor configured to confer at least in part the functionality of macro network platform 810. To that end, the one or more processor can execute code instructions stored in memory 886, for example.

Memory 886 can include information relevant to operation of the various components of femto network platform 880. For example operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
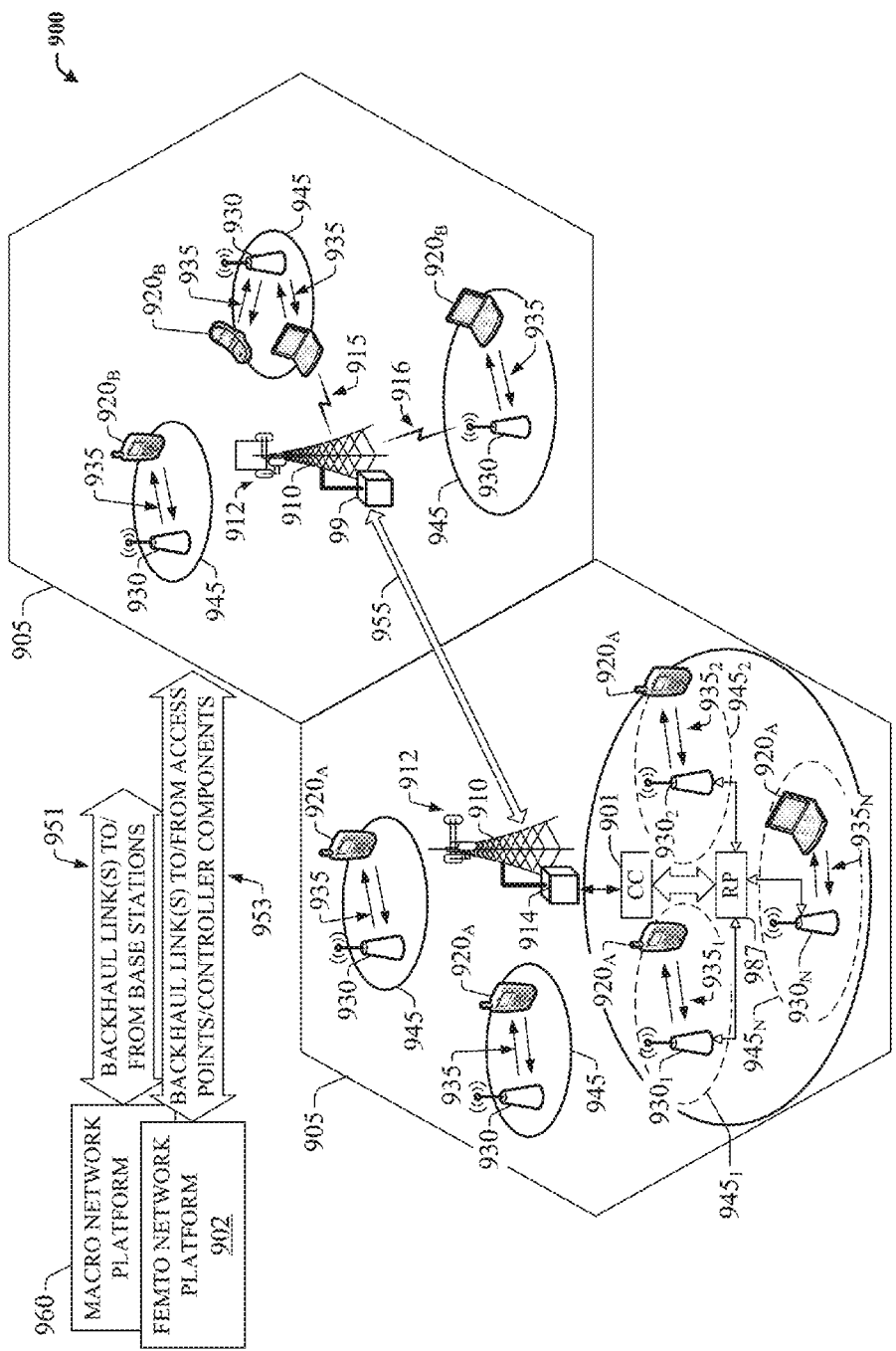
FIG. 9 illustrates a second example of a wireless communications environment with associated components that can be operable to execute certain embodiments of this disclosure.

FIG. 9 illustrates a wireless environment that includes macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can include functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs $920_A$ can be routed by the RP 987, for example, internally, to another UE $920_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $10^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE $920_A$ connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 includes a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
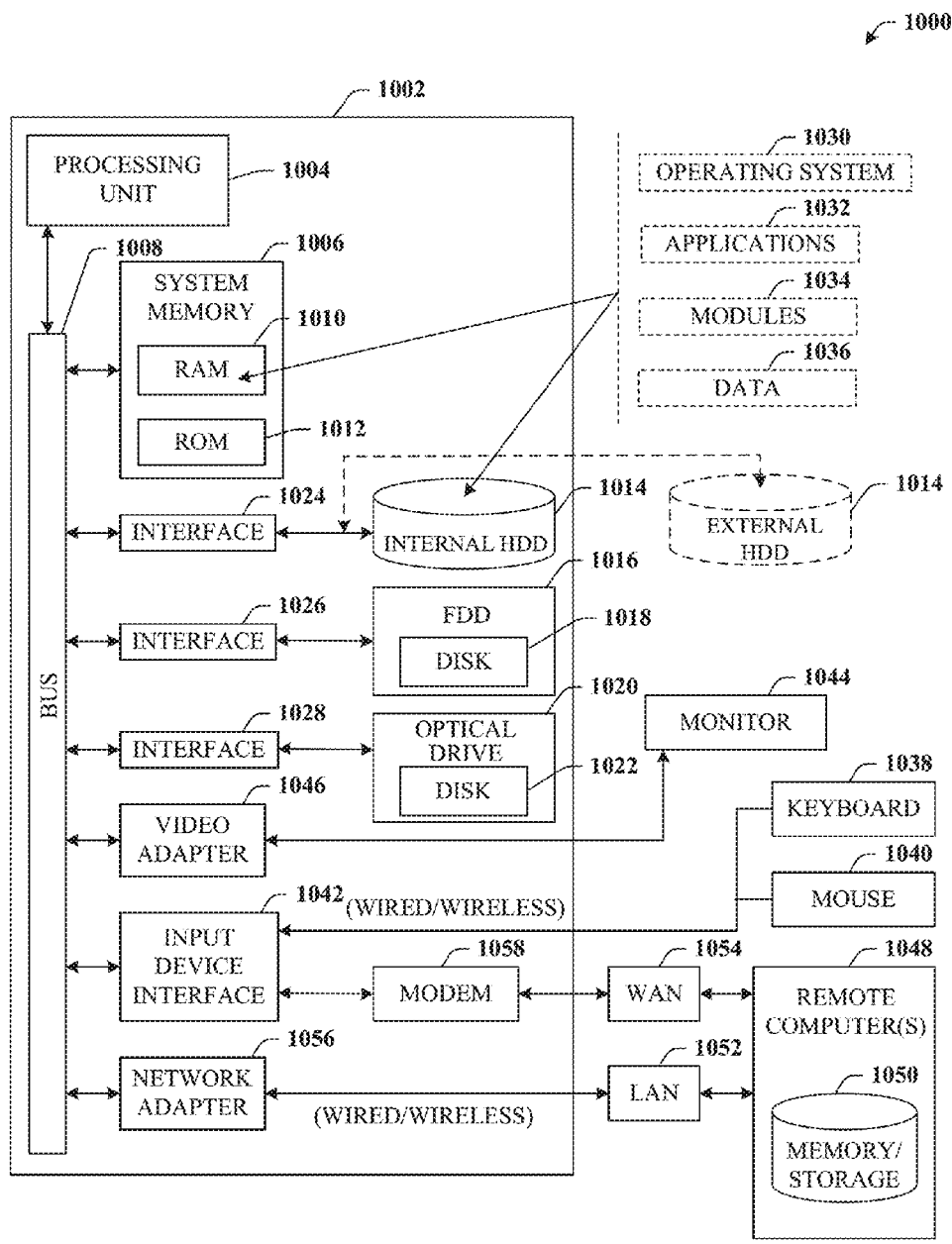
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A non-cellular access point device, comprising:
a processor; and
a memory that stores executable instructions that, when executed by the processor, facilitate performance of operations, comprising:
communicating with a user equipment according to a first communication protocol that differs from a second communication protocol supported by the user equipment, wherein the first communication protocol represents a non-cellular network protocol and the second communication protocol represents a cellular network protocol that natively supports explicit congestion notification data, and wherein the non-cellular access point device does not support communication via the second communication protocol;
determining that congestion data exceeds a defined threshold, wherein the congestion data is representative of a state of congestion of network devices the non-cellular access point device employs to communicate data; and
in response to the determining that the congestion data exceeds a defined threshold, updating a data structure representative of the explicit congestion notification data to reflect the state of congestion.

2. The non-cellular access point device of claim 1, wherein the first communication protocol is described by a communication standard selected from a group comprising: a wireless fidelity standard and a worldwide interoperability for microwave access standard.

3. The non-cellular access point device of claim 1, wherein the second communication protocol is described by a communication standard selected from a group comprising: a universal mobile telecommunications system standard that natively supports the explicit congestion notification data and a long term evolution standard that natively supports the explicit congestion notification data.

4. The non-cellular access point device of claim 1, wherein the explicit congestion notification data represents explicit congestion notification described by the Internet engineering task force standards organization.

5. The non-cellular access point device of claim 1, wherein the first communication protocol has been modified according to a modification to support explicit congestion notification data.

6. The non-cellular access point device of claim 5, wherein the modification to support explicit congestion notification data comprises an instruction to include the data structure in a header of a packet that is transmitted to the user equipment.

7. The non-cellular access point device of claim 1, wherein the data structure stores a single bit of information that indicates one of a group comprising: the state of congestion of the network devices is indicative of congestion encountered and the state of congestion of the network devices is indicative of no congestion encountered.

8. The non-cellular access point device of claim 1, wherein the data structure stores bits of information that support a range of levels of congestion in connection with the network devices.

9. The non-cellular access point device of claim 1, wherein the determining the congestion data exceeds the defined threshold comprises obtaining a measurement of the state of congestion.

10. The non-cellular access point device of claim 1, wherein the determining the congestion data exceeds the defined threshold comprises receiving an indication of the state of congestion from a network device of a network that operates according to the second communication protocol.

11. The non-cellular access point device of claim 1, wherein the operations further comprise:
transmitting at least a portion of the data structure to the user equipment; and
receiving data from the user equipment in response to the transmitting and a network selection procedure performed by the user equipment.

12. The non-cellular access point device of claim 11, wherein the network selection procedure comprises selection of an access point device to communicate data of an application being executed by the user equipment based on the explicit congestion notification data received from the non-cellular access point device and similar explicit congestion notification data received from a cellular access point device that operates according to the second communication protocol, and wherein the similar explicit congestion notification data is determined to be similar to the explicit congestion notification data according to a similarity criterion.

13. A non-transitory machine-readable storage medium, comprising executable instructions that, when executed by a processor, facilitate performance of operations, comprising, comprising:
 communicating with a user equipment according to a first communication standard that describes communication between a first access point device and the user equipment according to a non-cellular standard that differs from a second communication standard supported by the user equipment that describes communication between a second access point device and the user equipment according to a cellular standard that supports explicit congestion notification data, wherein the first access point device does not support the second communication standard;
 determining that congestion data exceeds a defined threshold, wherein the congestion data is representative of a state of congestion of network devices that the non-cellular access point device employs to communicate data; and
 updating a data structure representative of the explicit congestion notification data to reflect the state of congestion based on the determining the congestion data exceeds the defined threshold.

14. The non-transitory machine-readable storage medium of claim 13, wherein the operations further comprise transmitting the data structure to the user equipment.

15. The non-transitory machine-readable storage medium of claim 13, wherein the operations further comprise receiving data from the user equipment in response to a network selection procedure performed by the user equipment.

16. The non-transitory machine-readable storage medium of claim 15, wherein the network selection procedure comprises selecting an access point device to communicate data of an application being executed by the user equipment based on the explicit congestion notification data.

17. A method, comprising:
 communicating, by an access point device comprising a processor, with a user equipment according to a first communication protocol that describes communication according to a non-cellular standard and that differs from a second communication protocol supported by the user equipment representing a cellular network protocol that natively supports explicit congestion notification data, wherein the access point device does not support the second communication protocol;
 determining, by the access point device, congestion data representative of a level of congestion of network devices that the access point device uses to communicate data;
 updating, by the access point device, a data structure representative of the explicit congestion notification data to reflect the level of congestion; and
 transmitting, by the access point device, the data structure to the user equipment.

18. The method of claim 17, further comprising receiving, by the access point device, data from the user equipment in response to a network selection procedure performed by the user equipment that selects the access point device based on the explicit congestion notification data.

19. The method of claim 17, further comprising updating, by the access point device, the congestion data in response to measuring the level of congestion.

20. The method of claim 17, further comprising updating, by the access point device, the congestion data in response to receiving information indicative of the level of congestion from a network device that operates according to the cellular network protocol.

* * * * *